(12) United States Patent
Rüffer et al.

(10) Patent No.: US 7,823,986 B2
(45) Date of Patent: Nov. 2, 2010

(54) DEVICE FOR SUPPLYING PRESSURE TO AN ACTUATION UNIT OF A MOTOR VEHICLE BRAKING SYSTEM AND METHOD FOR CONTROLLING SAID DEVICE

(75) Inventors: Manfred Rüffer, Sulzbach (DE); Georg Fachinger, Limburg (DE); Holger Wahl, Wallrabenstein (DE); Albrich von Albrichsfeld, Darmstadt (DE); Uwe Karl, Wiesbaden (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 882 days.

(21) Appl. No.: 11/659,441

(22) PCT Filed: Aug. 4, 2005

(86) PCT No.: PCT/EP2005/053835

§ 371 (c)(1),
(2), (4) Date: Feb. 2, 2007

(87) PCT Pub. No.: WO2006/032571

PCT Pub. Date: Mar. 30, 2006

(65) Prior Publication Data

US 2008/0150351 A1    Jun. 26, 2008

(30) Foreign Application Priority Data

Aug. 6, 2004  (DE) .................. 10 2004 038 549
Aug. 1, 2005  (DE) .................. 10 2005 036 615

(51) Int. Cl.
*B60T 8/42* (2006.01)

(52) U.S. Cl. .................. 303/115.3; 303/10; 303/12; 303/15

(58) Field of Classification Search .................. 303/10, 303/11, 12, 3, 15, 20, 115.1, 115.2, 115.3, 303/116.1, 116.3; 60/327, 394, 397, 407, 60/409, 410, 411, 412
See application file for complete search history.

(56) References Cited

U.S. PATENT DOCUMENTS 4,738,112 A * 4/1988 Nomura et al. ............... 60/721

(Continued)

FOREIGN PATENT DOCUMENTS

DE           199 29 880 A1        1/2001

(Continued)

*Primary Examiner*—Pam Rodriguez
(74) *Attorney, Agent, or Firm*—RatnerPrestia

(57) ABSTRACT

A device for supplying pressure to an actuation unit of a vehicle brake system, in particular to a vehicle brake system of the 'brake-by-wire' type, comprising a pneumatic motor-and-pump assembly with a pump and a motor driving the pump, wherein the motor-and-pump assembly is controlled by an electronic control unit depending on a pressure level or pressure difference in a pneumatic brake booster of the actuation unit, with the pressure level in a chamber or a difference in pressure between two chambers of the brake booster being detected by means of a sensor. In order to maintain the availability of the service brake function as high as possible and to obtain a maximum possible redundancy, the control unit, used to control the motor-and-pump assembly comprises a logic module and a power module, which are arranged separately of each other.

18 Claims, 3 Drawing Sheets

U.S. PATENT DOCUMENTS

| | | | |
|---|---|---|---|
| 4,989,496 A * | 2/1991 | Bender | 91/516 |
| 5,035,158 A * | 7/1991 | Leigh-Monstevens | 477/36 |
| 5,515,676 A | 5/1996 | Earle | |
| 5,971,500 A * | 10/1999 | Voges et al. | 303/113.4 |
| 6,234,588 B1 * | 5/2001 | Sawada | 303/119.1 |
| 6,324,845 B1 * | 12/2001 | Fulks et al. | 60/582 |
| 6,443,535 B1 * | 9/2002 | Crombez et al. | 303/114.3 |
| 6,623,088 B2 * | 9/2003 | Roden et al. | 303/113.1 |

FOREIGN PATENT DOCUMENTS

| | | |
|---|---|---|
| DE | 100 52 257 A1 | 5/2002 |
| DE | 103 41 678 A1 | 3/2004 |
| EP | 0 330 918 A2 | 9/1989 |
| EP | 0 861 175 B1 | 9/1998 |

\* cited by examiner

DEVICE FOR SUPPLYING PRESSURE TO AN ACTUATION UNIT OF A MOTOR VEHICLE BRAKING SYSTEM AND METHOD FOR CONTROLLING SAID DEVICE

This application is the U.S. national phase application of PCT International No. PCT/EP2005/053835, filed Aug. 4, 2005, which claims priority to German Patent Application No. DE102004038549.1, filed Aug. 6, 2004 and German Patent Application No. DE102005036615.5, filed Aug. 1, 2005.

BACKGROUND OF THE INVENTION

1. Technical Field

The present invention relates to a device for supplying pressure to an actuation unit of a vehicle brake system, in particular to a vehicle brake system of the 'brake-by-wire' type, comprising a pneumatic motor-and-pump assembly with a pump and a motor driving the pump, wherein the motor-and-pump assembly is driven by an electronic control unit depending on a pressure level or pressure difference in a pneumatic brake booster of the actuation unit, with the pressure level in a chamber or a difference in pressure between two chambers of the brake booster being detected by means of a sensor.

2. Description of the Related Art

A device of this type and a method for supplying vacuum in a vehicle is e.g. disclosed in DE 199 29 880 A1, wherein the motor-and-pump assembly comprises a vacuum pump, which is additionally activated depending on operating conditions of the driving unit.

Vehicle brake systems of the 'brake-by-wire' type are operable in response to the driver's request by means of an electronic control unit (ECU), i.e. irrespective of the driver, as well as partly by means of a brake pedal (mechanical fallback mode). It is disadvantageous in systems without a boosted mechanical fallback mode that the service brake function, i.e. boosted braking, is given only when the electric energy supply exists. Failure of the electric energy supply or a defect in the electric control unit will cause that e.g. in a hydraulic brake-by-wire bake system, that means an electro-hydraulic brake (EHB), only non-boosted braking is possible in conformity with legal conditions (0.3 g with 500 N pedal force). In general, the failure probability of the electronic components, in particular the electric energy supply, is greater than that of the conventional, mechanical brake components so that enhanced technical measures must be taken, in order to maintain the availability of a brake-by-wire vehicle brake system in terms of the service brake function to a similarly high degree as in a conventional vehicle brake system.

Among others, this objective, i.e. enhancing the availability of the service brake function compared to an EHB, is also aimed at by the use of a regenerative brake based on a brake booster that is actuatable irrespective of the driver. The regenerative brake is mainly used in hybrid and electric vehicles. When this brake is envisaged for use in hydraulic vehicles equipped with an electric motor and an internal combustion engine, operating conditions are encountered in which the internal combustion engine does not supply pressure to the actuation unit, and therefore an electrically driven pump becomes necessary.

In particular in purely electrical vehicles, the pressure required must be generated by way of such a pump alone. Thus, the service brake function again depends on the availability of the electrical wiring system. Frequent attempts have been made for cost reasons to execute the control of the vacuum pump by way of the ECU of the brake system, whereby the service brake function also depends on the availability of the brake control unit.

SUMMARY OF THE INVENTION

In view of the above, an object of the invention involves maintaining the availability of the service brake function to the greatest degree possible, while preserving a maximum high rate of redundancy especially as regards errors or failure of the electronics or the electrical wiring system.

This object is achieved in that the control unit for controlling the motor-and-pump assembly includes a logic module and a power module, which are separated from each other. It is thereby achieved that errors of one module do not automatically have an effect on the other module and that the service brake function will not automatically fail as a consequence.

Redundancy of the power supply of the two modules is achieved in that the logic module and the power module are connected separately of each other to an electrical wiring system of the vehicle.

Favorable improvements of the invention provide that the control unit is used for the actuation of the motor-and-pump assembly and the brake system or for the actuation of a motor of the vehicle, that the logic module is arranged in the control unit, and that the power module is provided outside the control unit. This obviates the need for a separate control unit for the motor-and-pump assembly and allows economizing extra costs for additional components, failsafe, etc. The logic module for the actuation of the motor-and-pump assembly can be integrated almost without additional expenditure into the control unit of the brake system that is already provided. On the other hand, the power module comprises large electronic components such as relays or MOSFETs and requires a correspondingly large mounting space so that it is preferably provided at the motor-and-pump assembly or in another control unit of the vehicle. In this respect, it is likewise advantageous that a great temperature rise of the power module does not have any effect on the control unit of the motor-and-pump assembly and the brake system or on the control unit of the motor because corresponding structural measures for the dissipation of heat from the control unit would become necessary when integrating the power module into the control unit.

To save a separate housing, e.g. a relay is provided as a power module in a favorable embodiment, said relay being accommodated in a relay box of the vehicle.

According to another favorable embodiment, a semiconductor element, preferably a FET, is provided as a power module, being arranged in a relay box of the vehicle.

Further, a method for controlling a device of the invention is disclosed, and the special features of this method consist in that the motor-and-pump assembly is switched on upon failure of the control unit. This fact ensures the supply of pressure to the brake booster. In this regard, the motor-and-pump assembly can be activated preferably by a normally closed switch when the control unit fails.

In another favorable embodiment of the method of the invention, the motor-and-pump assembly is enabled upon failure of the control unit by actuation of a sensor for detecting brake pedal travel, e.g. by actuation of a brake light switch, and is disabled upon non-actuation of the sensor, the sensor being connected to a controlling device of a driving unit of the vehicle. Hence, a braking request of the driver is recognized and the pressure required for the boosted brake operation is made available in the brake booster by driving the motor-and-pump assembly.

To carefully treat the motor-and-pump assembly and to reduce the temperature rise, it is disclosed in a favorable improvement of the method of the invention that the motor-and-pump assembly is operated in a clock-controlled manner upon failure of the control unit.

With a view to maintaining the required pressure in the brake booster also after a brake operation, according to another favorable embodiment, the motor-and-pump assembly stays switched on for a predefined time after the actuation of the sensor in order to detect the brake pedal travel.

When the vehicle is a hybrid vehicle equipped with an internal combustion engine and an electric motor, a signal is favorably submitted to a motor control unit in the event of an error of the control unit, which drives the motor-and-pump assembly, and the internal combustion engine adopts an operating condition, in which the supply of the pressure to the actuation unit is carried out by the internal combustion engine alone. This implies that the internal combustion engine of the hybrid vehicle is not disabled in any operating condition in order to safeguard the necessary pressure supply to the brake booster.

When the vehicle brake system is equipped with an optimized hydraulic brake system (OHB) comprising a hydraulic pressure increasing unit that performs additional brake boosting depending on a pressure difference between chambers of the brake booster, with the difference in pressure being detected by a vacuum sensor, it is disclosed according to the invention that the motor-and-pump assembly is driven by a separate pump control unit and a separate sensor, which detects the pressure level of the brake booster in addition to the vacuum sensor, and that the motor-and-pump assembly is connected to the electrical wiring system of the motor vehicle by way of a separate line. This allows operation of the motor-and-pump assembly irrespective of the brake system. To economize components, it is however possible that the motor-and-pump assembly is driven by means of the vacuum sensor rather than by means of a separate sensor.

To secure the redundancy, the motor-and-pump assembly can be driven by means of a power module with separate current supply that is provided as a relay or FET, and the pump control unit and/or a brake control unit can read out signals of the vacuum sensor of the OHB system. When only one of the control units reads out the signals, the signals are preferably sent to the respectively other control unit by way of a bus connection.

When the signal is read out by the brake control unit, according to an advantageous improvement of the method of the invention, the motor-and-pump assembly is fully, driven upon failure of the brake control unit in order to safeguard the pressure supply in any case.

BRIEF DESCRIPTION OF THE PREFERRED EMBODIMENTS

The invention will be explained hereinbelow by way of the accompanying drawings showing embodiments. In the drawings.

DETAILED DESCRIPTION OF THE PREFERRED EMBODIMENTS

Figure 1:
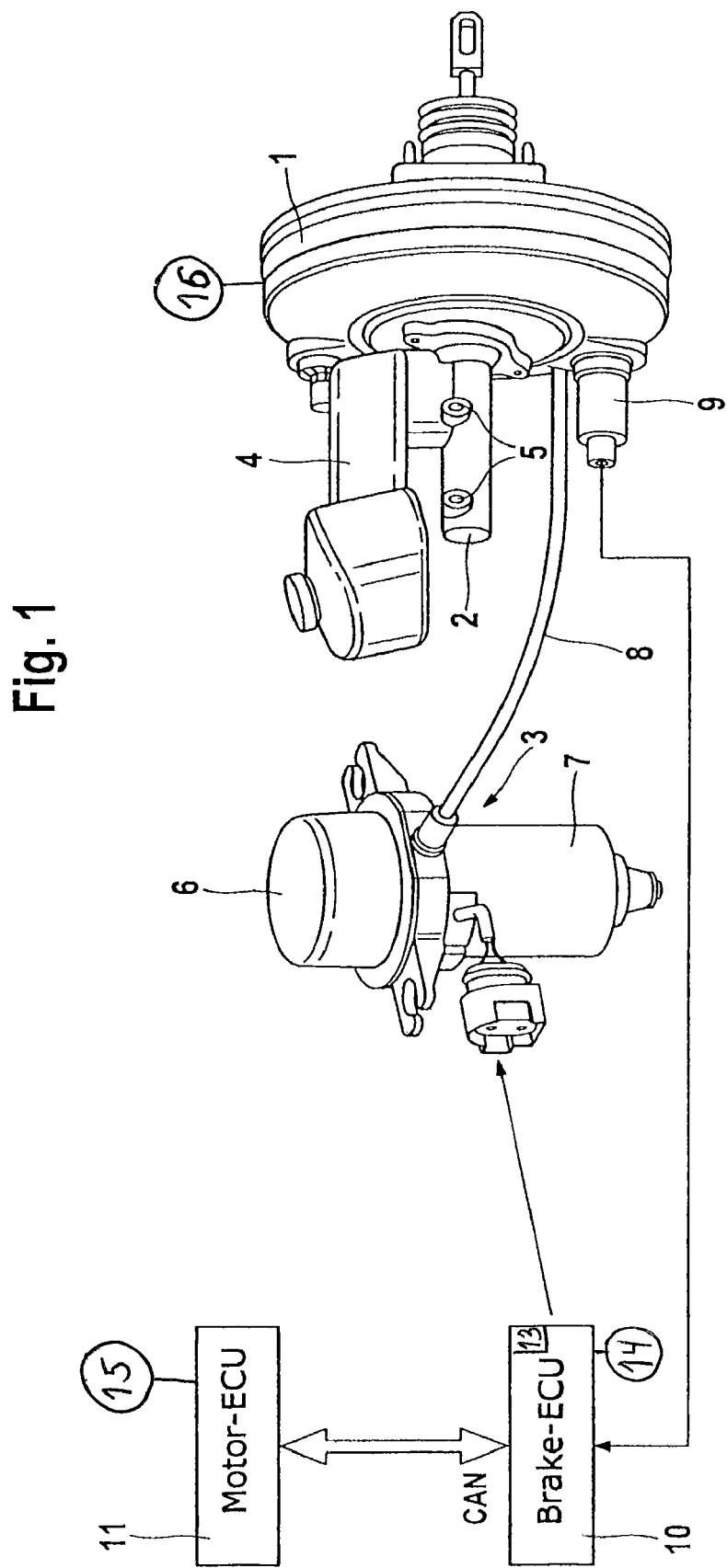
FIG. 1 shows a schematic system configuration of a first embodiment of a device of the invention.

FIG. 1 shows a schematic system configuration of a first embodiment of a device of the invention for supplying pressure to an actuating unit of a vehicle brake system of the 'brake-by-wire' type. It can be seen that the actuation unit comprises a pneumatic brake booster 1, and a master brake cylinder 2 arranged thereat. Vehicle brake systems of the 'brake-by-wire' type can be actuated in response to the driver's request by means of an electronic control unit (ECU), i.e. irrespective of the driver, but also partly by means of a brake pedal (not shown) (mechanical fallback mode).

The principal design and the function of the actuation unit are generally known so that only the features essential for the invention will be described in the following.

An inner space (not shown) of the brake booster 1 is subdivided by a movable wall into at least two chambers. In a vacuum brake booster, the inner space is subdivided into at least one vacuum chamber and at least one working chamber, while in an excess pressure brake booster the inner space is subdivided into at least one chamber of high pressure and at least one chamber of low pressure. The master brake cylinder 2 includes two pistons (not shown), which are displaceable in a housing and, together with the housing, delimit each one hydraulic pressure chamber. The pressure chambers are connectable to an unpressurized pressure fluid tank 4 and, by way of outlets 5, to non-illustrated wheel brakes of the vehicle brake system.

A pneumatic motor-and-pump assembly 3 comprises a pump 6 and a motor 7 driving the pump 6, which is configured e.g. as an electric motor. Depending on whether the brake booster 1 is operated by vacuum or excess pressure, the pump 6 is designed as a vacuum pump or as an excess pressure pump. However, this fact is not essential to the invention. Therefore, the following description founds merely on a vacuum brake booster with a vacuum chamber and a working chamber and on a vacuum pump. The brake booster can be designed as a single-type or tandem-type apparatus.

In order to supply vacuum to the brake booster 1, the vacuum pump 6 connects to the non-illustrated vacuum chamber of the brake booster 1 by way of a suction line 8. A sensor 9 arranged at the brake booster 1 or the vacuum pump 6 detects a vacuum level in the vacuum chamber or a difference in pressure between vacuum chamber and working chamber, and this detected pressure is evaluated in an electronic brake control unit (brake ECU) 10. According to the invention, the sensor 9 can also be arranged in the suction line 8.

The motor-and-pump assembly 3 is driven directly by the brake ECU 10, which can be provided e.g. as ESP control unit of a controlled brake system with Electronic Stability Program (ESP). For driving purposes, the brake ECU 10 includes a logic module 13 and a power module 14, and the two modules are separated from each other in order to avoid any effects that errors in one of the modules may have on the other modules. This means that the service function, i.e. boosted braking of the brake system, will not automatically fail in the event of a defect in any one of the modules. In order to obtain an additionally redundancy of the power supply, the modules are connected to an electrical wiring system of the vehicle separately of each other.

The logic module 13, which mainly comprises the software for driving the motor-and-pump assembly 3, can be integrated almost without additional effort into the brake ECU 10.

The power module 14, which comprises the switch unit for the actuation and can be provided e.g. as a relay or MOSFET, is arranged outside the brake ECU 10 as it needs additional mounting space due to the electronic components. Further, the separate arrangement involves the additional advantage that a great temperature rise of the power module will not have any effects on the brake ECU 10. The reason is that an additional temperature rise of the brake ECU 10 would necessitate corresponding structural measures to dissipate the heat. The power module can be arranged either at the motor-and-pump assembly 3, at another control unit of the vehicle, in a relay box of the vehicle, or between the brake ECU 10 and the motor 7. Besides, the last mentioned arrangement in the relay box renders it possible to economize one casing for the power module.

As becomes apparent from FIG. 1, the brake ECU 10 connects to an electronic motor control unit (motor ECU) 11 by way of a bus system CAN (Controller Area Network). In addition, the brake ECU 10 and the motor ECU 11 can connect via CAN to further control units in the vehicle.

Figure 2:
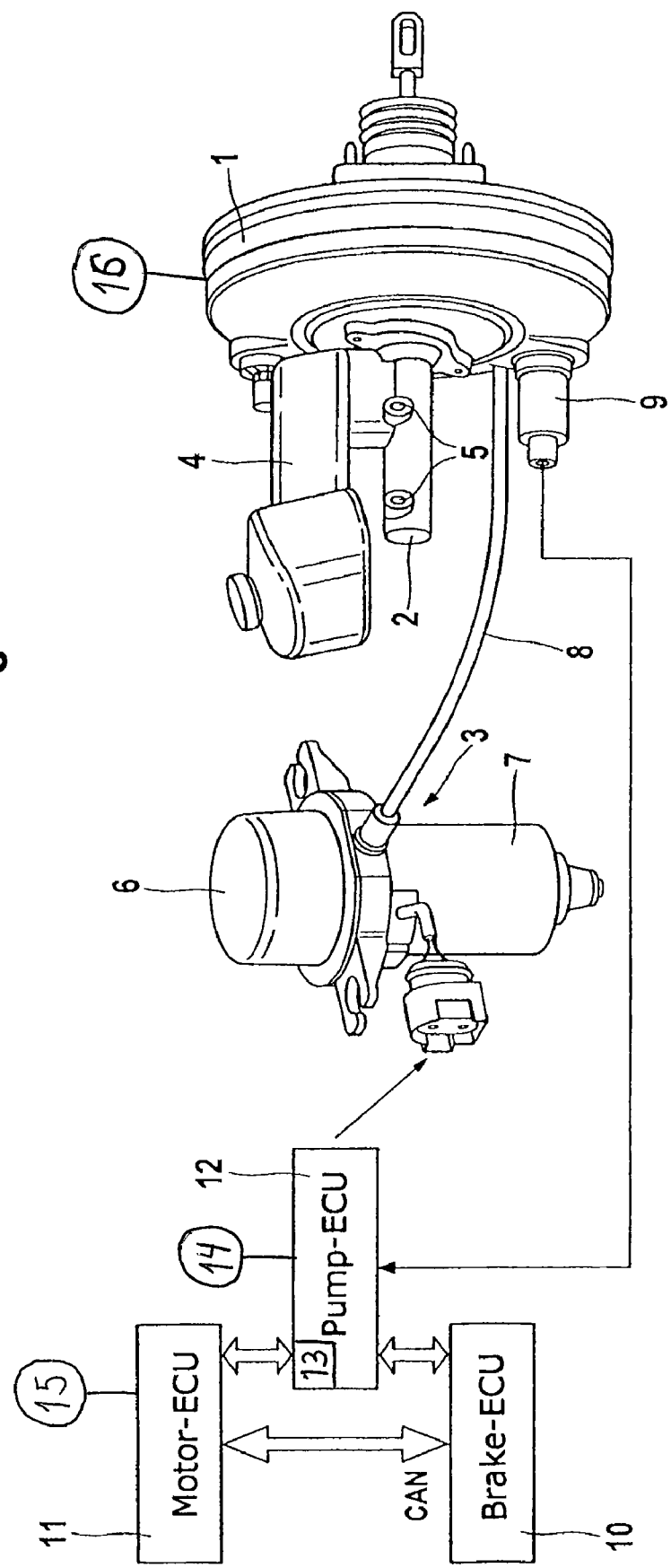
FIG. 2 shows a schematic system configuration of a second embodiment of a device of the invention.

FIG. 2 shows a schematic system configuration of a second embodiment of a device of the invention to supply pressure to an actuation unit of a vehicle brake system of the 'brake-by-wire' type. The latter differs from the first embodiment only in that a separate pump ECU 12 is provided to drive the motor-and-pump assembly 3, which reads in the signal of the sensor 9 and is connected to the brake ECU 10 and the motor ECU 11 via CAN. This allows an additional actuation of the motor-and-pump assembly 3 by way of the brake ECU 10. The logic module 13 and the power module 14 are also provided separately of each other, and the current supply of the modules takes place separately. In this embodiment, too, the logic module 13 can be provided in the pump ECU 12, and the power module 14 can be provided outside the pump ECU 12, e.g. in the relay box.

Figure 3:
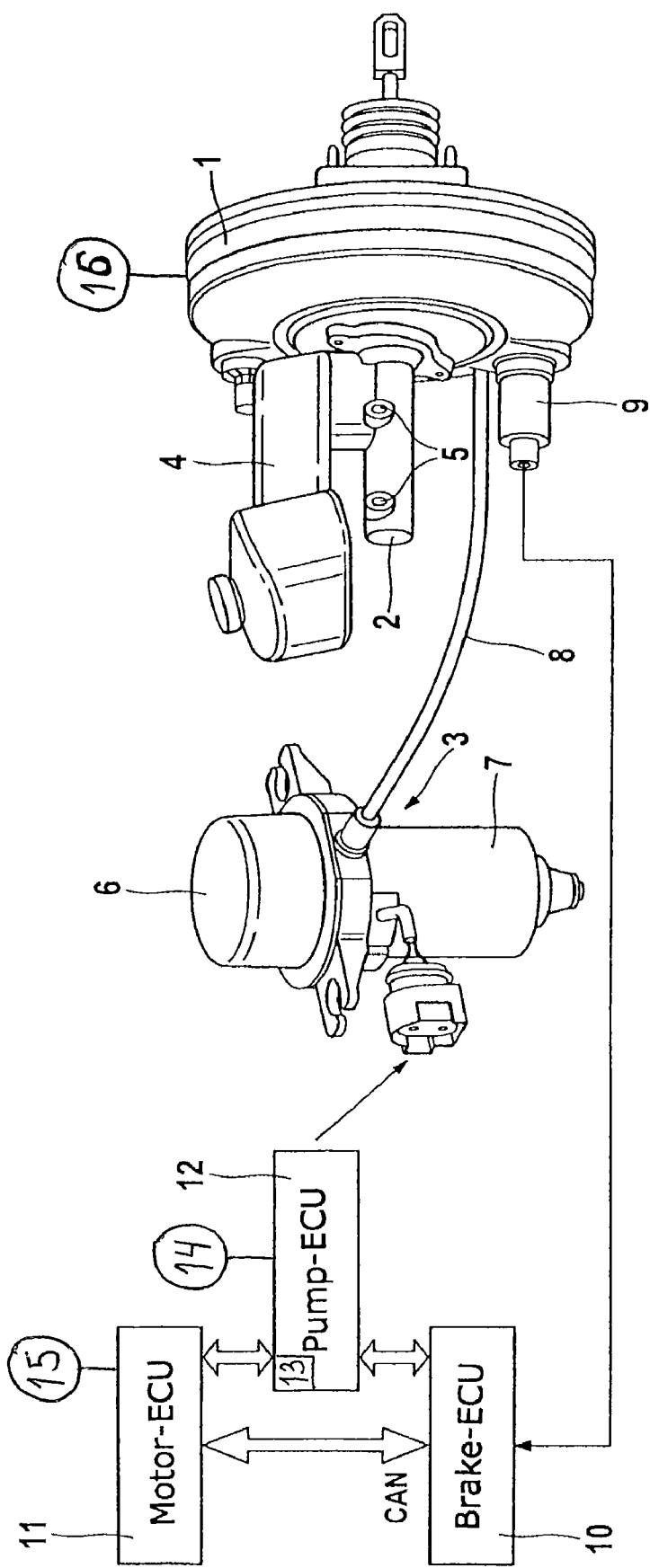
FIG. 3 shows a schematic system configuration of a third embodiment of a device of the invention.

Another possibility for signal read-out of the sensor 9 according to a third embodiment illustrated in FIG. 3 involves that the brake ECU 10 reads out the signals of the sensor 9 and supplies corresponding signals to the pump ECU 12 via the CAN connection.

In all embodiments described, the motor-and-pump assembly 3 is enabled upon failure of the driving control unit 10, 12, in order to safeguard the supply of pressure to the brake booster 1. As this occurs, the motor-and-pump assembly 3 can be switched on e.g. by a normally closed switch when the control unit fails.

According to another possibility, the motor-and-pump assembly 3 is enabled upon failure of the driving control unit 10, 12 by actuation of a sensor 15 for detecting brake pedal travel, e.g. a brake light switch, and is disabled upon non-actuation of the sensor 15, with the sensor 15 being read in by the motor ECU 11 irrespective of the control unit 10, 12.

For careful treatment and reduction of the temperature rise, the motor-and-pump assembly 3 can be operated in a clock-controlled manner when the control unit fails.

When the vehicle is a hybrid vehicle that is equipped with an internal combustion engine and an electric motor, a signal is submitted to the motor ECU 11 in the event of an error of the control unit (brake ECU 10 or separate pump ECU 12), which drives the motor-and-pump assembly 3, and the internal combustion engine adopts an operating condition, in which the supply of the pressure to the actuation unit is carried out by the internal combustion engine alone. This implies that the internal combustion engine of the hybrid vehicle is not disabled in any operating condition in order to safeguard the necessary pressure supply to the brake booster 1.

A so-called regenerative brake is used above all in a hybrid vehicle for the economy of energy, and the kinetic energy of the rolling vehicle is converted upon braking into electric energy, which is stored temporarily due to an intelligent energy management and introduced into a drive train when the vehicle pulls away or accelerates, with the result that the internal combustion engine is relieved from load. All described embodiments of the device of the invention can be implemented in a hybrid vehicle.

When the vehicle brake system, in order to enhance the availability of the service brake function, is equipped with an optimized hydraulic brake system (OHB) comprising a hydraulic pressure increasing unit that performs additional brake force boosting depending on a pressure difference between chambers of the brake booster, the difference in pressure is detected by a vacuum sensor 16 arranged on the brake booster. The pressure increasing unit is e.g. provided as a pump, which modulates the pressure in wheel brake circuits. This allows maintaining the boosting effect also beyond a point of maximum boosting of the brake booster, allows presenting a hydraulic brake assist function, or compensating failure of the brake booster.

The motor-and-pump assembly 3 can be driven by the separate pump control unit and the sensor 9 described according to FIGS. 2 and 3, which sensor 9 detects the pressure level of the brake booster in addition to the vacuum sensor 16 of the OHB system. The motor-and-pump assembly 3 is connected to the electrical wiring system of the motor vehicle by way of a separate line, what allows operation of the motor-and-pump assembly 3 irrespective of the brake system.

To economize components, it is however possible that the motor-and-pump assembly is driven by means of the vacuum sensor 16 rather than by means of the separate sensor 9. To secure the redundancy, the vacuum sensor 16 can be driven by means of the power module 14 with Separate current supply that is provided as a relay, and the signals can be read out by the pump ECU 12 and the brake ECU 10. When only one of the control units 10 or 12 reads out the signals, the signals are supplied to the respectively other control unit by way of the CAN connection.

When the signal is read out by the brake ECU 10, it is suitable that the motor-and-pump assembly 3 is fully driven upon failure of the brake ECU 10 in order to safeguard the pressure supply in any case.

The invention claimed is:

1. A method of controlling:
   a device for supplying pressure to an actuation unit of a vehicle brake system of a hybrid vehicle equipped with an internal combustion engine and an electric motor, the device including a pneumatic motor-and-pump assembly with a pump and a motor driving the pump, wherein the pneumatic motor-and-pump assembly is driven by an electronic control unit depending on a pressure level or pressure difference in a pneumatic brake booster of the actuation unit, with the pressure level in a chamber or a difference in pressure between two chambers of the brake booster being detected by means of a sensor, and wherein the control unit for controlling the pneumatic motor-and-pump assembly comprises a logic module and a power module which are arranged separately of each other, the method comprising the steps of:
   sensing the pressure level in the chamber or the difference in pressure between the two chambers of the brake booster of the actuation unit;

driving the pneumatic motor-and-pump assembly with the electronic control unit depending on the pressure level or the pressure difference in the pneumatic brake booster;

activating the pneumatic motor-and-pump assembly upon a failure of the electronic control unit;

submitting a signal to a motor control unit in the event of an error of the electronic control unit which drives the motor-and-pump assembly; and operating the internal combustion engine such that the supply of the pressure to the actuation unit is carried out by the internal combustion engine alone.

2. Method as claimed in claim 1,
wherein the activating step comprises switching on the motor-and-pump assembly by a normally closed switch upon the failure of the electronic control unit.

3. Method as claimed in claim 1,
wherein the activating step comprises activating the pneumatic motor-and-pump assembly upon the failure of the control unit along with actuation of a sensor for detecting brake pedal travel, the sensor being connected to a controlling device of a driving unit of the vehicle.

4. Method as claimed in claim 3,
wherein the pneumatic motor-and-pump assembly remains activated for a predefined time after actuation of the sensor for detecting the brake pedal travel.

5. Method as claimed in claim 1,
further comprising the step of operating the motor-and-pump assembly in a clock-controlled manner upon the failure of the control unit.

6. Method for controlling a device for supplying pressure to an actuation unit of a vehicle brake system comprising a pneumatic motor-and-pump assembly with a pump and a motor driving the pump, wherein the pneumatic motor-and-pump assembly is driven by an electronic control unit depending on a pressure level or pressure difference in a pneumatic brake booster of the actuation unit, with the pressure level in a chamber or a difference in pressure between two chambers of the brake booster being detected by means of a sensor, and wherein the control unit for controlling the pneumatic motor-and-pump assembly comprises a logic module and a power module which are arranged separately of each other, and wherein the vehicle brake system is equipped with an optimized hydraulic brake system comprising a hydraulic pressure increasing unit that performs additional brake boosting depending on the pressure difference between the chambers of the brake booster, with the difference in pressure being detected by a vacuum sensor, and wherein the motor-and-pump assembly is connected to an electrical wiring system of the motor vehicle by way of a separate line, and wherein the pneumatic motor-and-pump assembly is driven using a separate pump control unit and a separate sensor distinct from the vacuum sensor, the method comprising the steps of:

sensing the pressure level in the chamber or the difference in pressure between the two chambers of the brake booster of the actuation unit;

driving the pneumatic motor-and-pump assembly with the electronic control unit depending on the pressure level or the pressure difference in the pneumatic brake booster; and activating the pneumatic motor-and-pump assembly upon a failure of the electronic control unit.

7. Method as claimed in claim 6,
wherein the activating step comprises switching on the motor-and-pump assembly by a normally closed switch upon the failure of the electronic control unit.

8. Method as claimed in claim 6,
wherein the activating step comprises activating the pneumatic motor-and-pump assembly upon the failure of the control unit along with actuation of a sensor for detecting brake pedal travel, the sensor being connected to a controlling device of a driving unit of the vehicle.

9. Method as claimed in claim 8,
wherein the pneumatic motor-and-pump assembly remains activated for a predefined time after actuation of the sensor for detecting the brake pedal travel.

10. Method as claimed in claim 6,
further comprising the step of operating the motor-and-pump assembly in a clock-controlled manner upon the failure of the control unit.

11. Method for controlling a device for supplying pressure to an actuation unit of a vehicle brake system comprising a pneumatic motor-and-pump assembly with a pump and a motor driving the pump, wherein the pneumatic motor-and-pump assembly is driven by an electronic control unit depending on a pressure level or pressure difference in a pneumatic brake booster of the actuation unit, with the pressure level in a chamber or a difference in pressure between two chambers of the brake booster being detected by means of a sensor, and wherein the control unit for controlling the pneumatic motor-and-pump assembly comprises a logic module and a power module which are arranged separately of each other, and wherein the vehicle brake system is equipped with an optimized hydraulic brake system comprising a hydraulic pressure increasing unit that performs additional brake boosting depending on the pressure difference between the chambers of the brake booster, with the difference in pressure being detected by a vacuum sensor, and wherein the motor-and-pump assembly is connected to an electrical wiring system of the motor vehicle by way of a separate line, and wherein the pneumatic motor-and-pump assembly is driven using a separate pump control unit and the vacuum sensor, the method comprising the steps of:

sensing the pressure level in the chamber or the difference in pressure between the two chambers of the brake booster of the actuation unit;

driving the pneumatic motor-and-pump assembly with the electronic control unit depending on the pressure level or the pressure difference in the pneumatic brake booster; and activating the pneumatic motor-and-pump assembly upon a failure of the electronic control unit.

12. Method as claimed in claim 11,
wherein the pneumatic motor-and-pump assembly is driven by means of a power module with separate current supply that is provided as a relay or FET, and signals from the vacuum sensor are read by the pump control unit or a brake control unit, or both.

13. Method as claimed in claim 12,
wherein the pneumatic motor-and-pump assembly is fully driven upon failure of the brake control unit.

14. Method as claimed in claim 11,
wherein the pump control unit is connected to additional control units of the vehicle by way of a bus connection.

15. Method as claimed in claim 11,
wherein the activating step comprises switching on the motor-and-pump assembly by a normally closed switch upon the failure of the electronic control unit.

16. Method as claimed in claim 11,
wherein the activating step comprises activating the pneumatic motor-and-pump assembly upon the failure of the control unit along with actuation of a sensor for detecting brake pedal travel, the sensor being connected to a controlling device of a driving unit of the vehicle.

17. Method as claimed in claim 16,
wherein the pneumatic motor-and-pump assembly remains activated for a predefined time after actuation of the sensor for detecting the brake pedal travel.

18. Method as claimed in claim 11,
further comprising the step of operating the motor-and-pump assembly in a clock-controlled manner upon the failure of the control unit.

* * * * *